United States Patent [19]

Hanaoka

[11] 4,186,364
[45] Jan. 29, 1980

[54] METHOD OF MAGNETIZING ERASING HEAD

[75] Inventor: Naohiro Hanaoka, Tama, Japan

[73] Assignee: Olympus Optical Limited, Tokyo, Japan

[21] Appl. No.: 913,909

[22] Filed: Jun. 8, 1978

Related U.S. Application Data

[63] Continuation-in-part of Ser. No. 739,865, Nov. 9, 1976, abandoned, which is a continuation of Ser. No. 559,653, Mar. 18, 1975, abandoned.

[51] Int. Cl.$^2$ .............................................. H01F 13/00
[52] U.S. Cl. ...................................... 335/284; 29/603; 361/143
[58] Field of Search ........................ 335/284; 361/143; 29/603; 360/66, 118

[56] References Cited

U.S. PATENT DOCUMENTS 3,139,567  6/1964  Atkinson .............................. 335/284
3,417,295  12/1968  Littwin ................................ 361/143

Primary Examiner—Harold Broome
Attorney, Agent, or Firm—Haseltine, Lake & Waters

[57] ABSTRACT

A method of magnetizing an erasing head for small type tape recorders is disclosed. An erasing head having its opposite ends formed in at least one convex surface is disposed in a space formed between at least two opposed electromagnetic poles. That surface of the electromagnetic pole which is opposed to the convex surface of the erasing head is made concave which corresponds in curvature to the convex surface of the erasing head such that a tangential direction of a tape travelling movement is perpendicular to a direction of a magnetic flux of the erasing head. In addition, a center axis of the erasing head is mechanically aligned with a center axis common to both the opposite electromagnetic poles by means of a jig such that a widthwise direction of a tape is perpendicular to the direction of magnetic flux of the erasing head.

4 Claims, 14 Drawing Figures

FIG._1 PRIOR ART
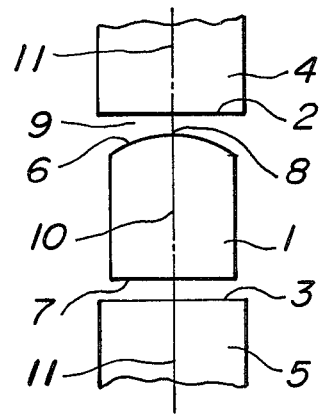
FIG._2a PRIOR ART
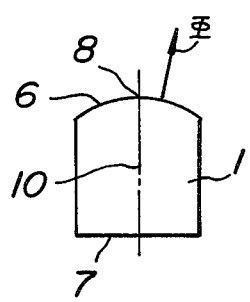
FIG.2b PRIOR ART
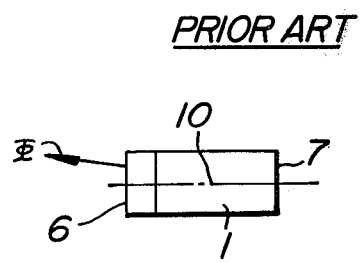
FIG._3
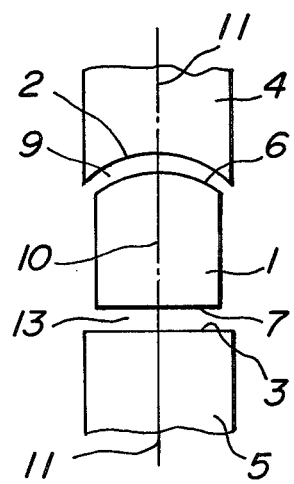

METHOD OF MAGNETIZING ERASING HEAD

This is a continuation-in-part of application Ser. No. 739,865, filed Nov. 9, 1976 which is in turn a continuation of application Ser. No. 559,653, filed Mar. 18, 1975 both abandoned.

This invention relates to methods of magnetizing erasing heads and more particularly to a method of magnetizing an erasing head for small type tape recorders including at least one convex surface which makes contact with a magnetic tape.

In a small type tape recorder, an erasing head mounted on the tape recorder and obliterating previous recordings on a magnetic tape by demagnetization of the magnetic tape just before a new recording is made is required to be extremely small in size and operate without consuming electric power, because use is made of a battery as an electric power source. For this purpose, it is preferable to use a single pole type erasing head made of a permanent magnet and obliterating previous recordings on the magnetic tape by magnetic saturation of the magnetic tape by making an N pole or S pole of the permanent magnet contact with the magnetic tape just before the new recording is made.

The permanent magnet of the single pole type erasing head can be produced by magnetizing a magnetic body made of barium ferrite and the like whose residual magnetic flux density is large.

A conventional method of magnetizing the above mentioned erasing head which has heretofore been proposed comprises the steps of disposing an erasing head 1 to be magnetized between two flat end surfaces 2 and 3 of two opposed magnetic poles 4 and 5 of a magnetizer, generating a direct current magnetic field between these magnetic poles 4 and 5, and magnetizing the erasing head 1 as shown in FIG. 1.

The front surface 6 of the erasing head 1 which makes contact with a magnetic tape (not shown) is made convex toward the front by grinding for the purpose of providing a close contact between the erasing head 1 and the magnetic tape.

If the erasing head 1 whose front surface 6 is convex and whose rear surface 7 is flat is disposed between the two opposed magnetic poles 4 and 5 of the magnetizer and then exposed to the direct current magnetic field, the magnetic flux is concentrated into a top portion 8 of the convex surface 6. This is because of the fact that an air gap 9 formed between the convex surface 6 of the erasing head 1 and the flat surface 2 of the electromagnetic pole 4 opposed thereto is not uniform in thickness, and that the thickness of the air gap 9 at the top portion 8 of the convex surface 6 of the erasing head 1 is smaller than that of the air gap at any other portions of the convex surface 6 of the erasing head 1, and as a result, the magnetic reluctance at the top portion 8 of the convex surface 6 of the erasing head 1 becomes smaller than that at any other portions of the convex surface 6 of the erasing head 1.

The erasing head 1 thus magnetized by the conventional method as above described is not uniform in the surface flux density along the convex surface 6. That is, the surface flux density is large at the top portion 8 only of the convex surface 6, but is considerably attenuated at any other portions thereof.

In addition, in the case of magnetizing the erasing head 1, the erasing head 1 must be disposed between the two opposed electromagnetic poles 4 and 5 of the magnetizer such that a center axis 10 of the erasing head 1 is in alignment with a center axis 11 common to both the opposite electromagnetic poles 4 and 5 of the magnetizer. If not, the direction of magnetization is inclined from the center axis 10 of the erasing head 3, and as a result, there is a risk of a tangential direction of a tape travelling movement being not perpendicular to a direction of magnetic flux $\Phi$ of the erasing head as shown in FIG. 2a or there is a risk of a widthwise direction of the tape being not perpendicular to the direction of magnetic flux $\Phi$ of the erasing head as shown in FIG. 2b.

The disadvantage of the aforesaid, known erasing head 1 consists in that if it is used to obliterate previous recordings on the magnetic tape by magnetic saturation thereof, irregular or incomplete erasure of the previous recordings particularly at the low sound frequency region is liable to be occurred, and that more particularly if the magnetic tape becomes jumped at the convex surface 6 of the erasing head 1 to form a slight gap between the magnetic tape and the convex surface 6 of the erasing head 1, the erasing effect becomes further degraded.

An object of the invention is to provide a method of magnetizing an erasing head which can obviate the above mentioned disadvantage which has been encountered with the known magnetizing method and which can uniformly magnetize the erasing head along its convex surface such that previous recordings on the magnetic tape are completely and regularly obliterated by magnetic saturation of the magnetic tape.

A feature of the invention is the provision of a method of magnetizing an erasing head for small type tape recorders including at least one convex surface which makes contact with a magnetic tape, comprising
  making that end surface of opposed electromagnetic poles which is opposed to a convex surface of an erasing head concave which corresponds in curvature to said convex surface of said erasing head such that a tangential direction of a tape travelling movement is perpendicular to the direction of magnetic flux of said erasing head;
  precisely making a thickness of an air gap formed between said concave surface of said electromagnetic pole and said convex surface of said erasing head precisely constant with the aid of a jig;
  magnetizing said erasing head such that a widthwise direction of said tape is perpendicular to said direction of magnetic flux;
  detecting a deviation angle of the direction of magnetization of said erasing head from a reference direction with the aid of a tester;
  making said deviation angle of said erasing head zero with the aid of said jig; and
  magnetizing a lot of erasing heads in succession by said opposed magnetic poles in said jig.

The invention will now be described in greater detail with reference to the accompanying drawings, wherein:
  FIG. 1 is a plan view showing schematically a known method of magnetizing an erasing head having its opposite ends formed in convex and flat surfaces, respectively;
  FIG. 2a is a plan view of the erasing head magnetized by the known method illustrated in FIG. 1;
  FIG. 2b is its side elevation;
  FIG. 3 is a plan view showing schematically a first embodiment of the method of magnetizing the erasing head according to the invention;

Figure 4A:
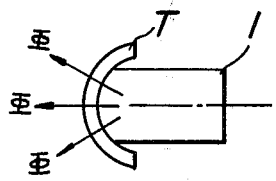
FIGS. 4a and 4b are plan views of the erasing head magnetized by the method according to the invention illustrated in FIG. 1.

In FIG. 3 is shown a first embodiment of the method according to the invention. In the present embodiment, that end surface 2 of the two opposed electromagnetic poles 4, 5 which is opposed to the convex surface 6 of the erasing head 1 to be magnetized is made concave and extended along and in conformity in curvature with the convex surface 6 of the erasing head 1 to be magnetized. The other end surface 3 of the opposed electromagnetic pole 5 which is opposed to the flat surface 7 of the erasing head 1 to be magnetized is remained flat as in the case of the conventional method shown in FIG. 1.

The erasing head 1 is disposed between the two opposed electromagnetic poles 4 and 5 of the magnetizing apparatus such that the front convex surface 6 of the erasing head 1 is opposed to the concave surface 2 of the electromagnetic pole 4 of the magnetizing apparatus. During disposing the erasing head 1 between the two opposed electromagnetic poles 4 and 5 of the magnetizing apparatus, use is made of a jig shown in FIGS. 6 and 7 so as to mechanically align the center axis 10 of the erasing head 1 with the center axis 11 common to both the two opposed electromagnetic poles 4 and 5. Then, a direct current magnetic field is produced between the two opposed electromagnetic poles 4 and 5 of the magnetizing apparatus to magnetize the erasing head 1.

The use of the magnetizing method described ensures formation of air gaps 9 and 13 which are uniform in thickness between the concave end surface 2 of the electromagnetic pole 4 and the convex end surface 6 of the erasing head 1 on the one hand and between the flat end surface 3 of the electromagnetic pole 5 and the flat end surface 7 of the erasing head 1 on the other hand. As a result, the magnetic reluctance becomes uniformly distributed in both the air gaps 9 and 13. Thus, the magnetic flux is uniformly distributed in a magnetic circuit from the concave surface 2 of the electromagnetic pole 4 through the erasing head 1 to the flat surface 3 of the electromagnetic pole 5, as a result, the erasing head 1 is uniformly magnetized along the convex surface 6 thereof, thereby making the surface flux density uniform along the convex surface 6 of the erasing head 1.

In addition, the alignment of the center axis 10 of the erasing head 1 with the center axis 11 of the magnetizing apparatus is correctly maintained during their assembly with the aid of the jig, so that there is no risk of the direction of the magnetic flux Φ from the erasing head 1 after its magnetization being deviated from the direction of the center axis 10 of the erasing head 1.

Figure 4B:
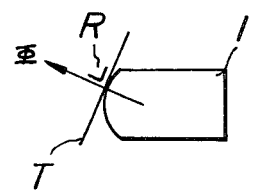
Figure 4C:
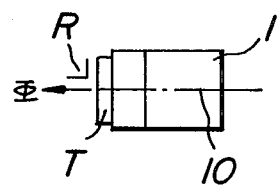
FIG. 4c is its side elevation.
Figure 6:
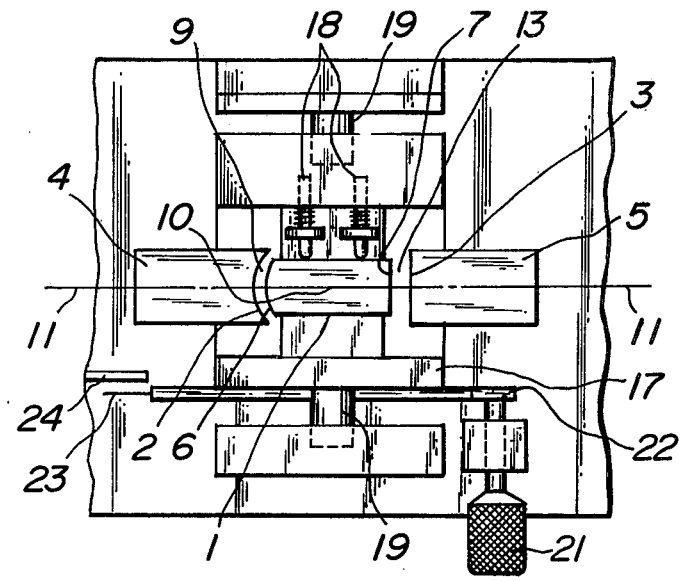
FIG. 6 is a front elevational view of a jig for precisely making a thickness of an air gap formed between a concave surface of opposed electromagnetic poles and a convex surface of an erasing head constant and correcting a deviation angle of the erasing head.
Figure 7:
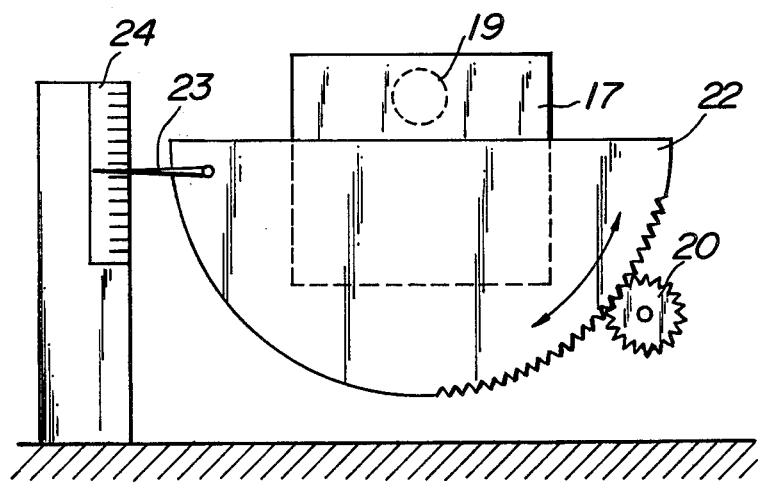
FIG. 7 is a plan view of a gear for rotating the erasing head.

As described above, in the present invention, it is necessary that the concave surface of the electromagnetic poles corresponds in curvature to the convex surface of the erasing head such that the tangential direction T of the tape travelling movement is perpendicular to the direction of magnetic flux Φ of the erasing head as shown in FIGS. 4a and 4b, that in the case of magnetization the air gap formed between the concave surface of the electromagnetic pole and the convex surface of the erasing head is precisely made constant in thickness with the aid of the jig shown in FIGS. 6 and 7, and that the erasing head is magnetized such that the direction of magnetic flux Φ is perpendicular to the widthwise direction of the tape T as shown in FIG. 4c.

Figure 5:
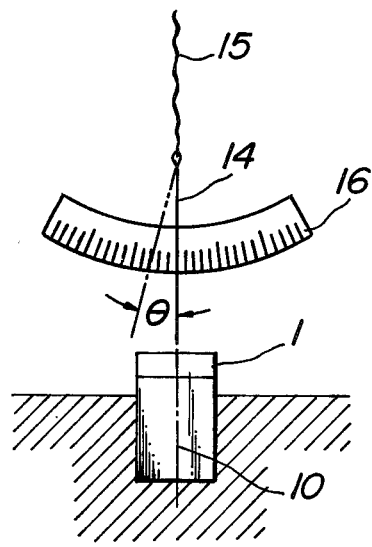
FIG. 5 is a schematic view of a tester for measuring a deviation angle of a direction of magnetization of the erasing head.

If the direction of magnetic flux Φ of the erasing head 1 is not perpendicular to the widthwise direction of the tape T, that is, not aligned with the center axis 10 of the erasing head 1. Such deviation angle is detected by a tester shown in FIG. 5. In the tester shown in FIG. 5, a soft ion needle 14, for example, is suspended from a thread 15. The center axis 10 of the erasing head 1 is aligned with the needle 14.

If the direction of magnetization of the erasing head 1 is deviated from the direction of its center line 10 or from a reference plane by an angle Φ, for example, the needle 14 is inclined from its suspended position by the angle Φ which is read out by a scale 16.

In the present invention, this deviation angle is corrected to zero by the jig shown in FIGS. 6 and 7.

In the jig shown in FIGS. 6 and 7, the opposed electromagnetic poles 4, 5 are made stationary with their own center axes 11, 11 aligned with each other, while the erasing head 1 is mounted on a support 17 such that it can slidably move along its axial direction and can be held by resiliently adjustable screws 18 and that it can rotate about opposed shafts 19, 19. A pinion 20 is manually rotated by a knob 21 to rotate a sector gate 22 together with the erasing head 1 about the shafts 19, 19 until a needle 23 secured to the sector gear 22 indicates on a scale 24 that deviation angle Φ is zero. Thus, it is possible to correct the deviation angle Φ by seeing the position of the needle 23 on the scale 24.

Then, a lot of erasing heads to be magnetized can be magnetized by the jig shown in FIGS. 6 and 7.

Figure 8:
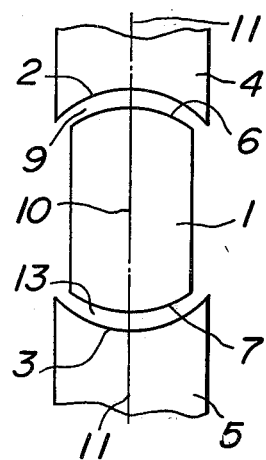
FIG. 8 is a plan view showing schematically a second embodiment of the method according to the invention.

In FIG. 8 is shown a second embodiment of the method according to the invention. In the present embodiment, two opposite end surfaces 6 and 7 of the erasing head 1 are made convex, respectively, and those end surfaces 2 and 3 of the two opposed electromagnetic poles 4 and 5 which are opposed to the convex surfaces 6 and 7 of the erasing head 1 are made concave and extended along and in conformity with the convex surfaces 6 and 7 of the erasing head 1 to be magnetized. The erasing head 1 is disposed in the space formed between the two opposed electromagnetic poles 4 and 5 provided in the jig shown in FIGS. 6 and 7. During disposing the erasing head 1 between the two opposed magnetic poles 4 and 5, the jig can mechanically align the center axis 10 of the erasing head 1 with the center axis 11 common to both the opposed electromagnetic poles 4 and 5. Then, the direct current magnetic field is produced between the two opposed electromagnetic poles 4 and 5 of the magnetizing apparatus to magnetize the erasing head 1.

The use of the magnetizing method described also ensures formation of air gaps 9 and 13 which are uniform in thickness between the concave end surface 2 of the electromagnetic pole 4 and the convex end surface 6 of the erasing head 1 on the one hand and between the concave end surface 3 of the electromagnetic pole 5 and the convex end surface 7 of the erasing head 1 on the other hand. As a result, the surface flux density becomes uniform along the both convex surfaces 6 and 7 of the erasing head 1 in the same manner as that described with reference to FIG. 3.

As stated hereinbefore, the erasing head 1 magnetized by the first and second embodiments of the method according to the invention has a surface flux density which is uniform along at least one convex surface of the erasing head and provides the important advantage that previous recording on the magnetic tape can be obliterated by magnetic saturation of the magnetic tape in a regular and satisfactory manner.

Figure 9:
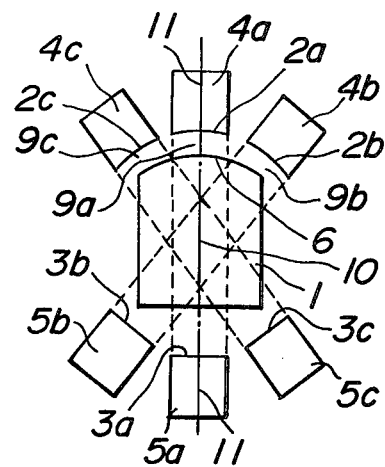
FIG. 9 is a plan view showing schematically a third embodiment of the method according to the invention.

In FIG. 9 is shown a third embodiment of the method according to the invention. In the present embodiment, the two opposed electromagnetic poles 4 and 5 shown in FIG. 3 are divided into three electromagnetic poles 4a, 4b and 4c; 5a, 5b and 5c, respectively. The end surfaces 2a, 2b, 2c; 3a, 3b, 3c of these divided electromagnetic poles 4a, 4b, 4c; 5a, 5b, 5c are equally spaced apart from each other and extended along and in conformity with the convex surface 6 of the erasing head 1 to be magnetized. The erasing head 1 is disposed in the space formed between the six opposed electromagnetic poles 4a, 4b, 4c and 5a, 5b, 5c provided in the jig shown in FIGS. 6 and 7. During disposing the erasing head 1 between the six opposed electromagnetic poles 4a, 4b, 4c and 5a, 5b, 5c of the magnetizing apparatus, the jig can mechanically align the center axis 10 of the erasing head 1 with the center axis 11 common to both the two opposed electromagnetic poles 4a and 5a. Then, the direct current magnetic field is produced between the six opposed electromagnetic poles 4a, 5a, 4b, 5b and 4c, 5c of the magnetizing apparatus, respectively, to magnetize the erasing head 1.

The use of the magnetizing method described ensures formation of air gaps 9a, 9b and 9c which are substantially uniform in thickness between the concave end surfaces 2a, 2b, 2c of the electromagnetic poles 4a, 4b, 4c and the convex end surface 6 of the erasing head 1.

As described in the known magnetizing method with reference to FIG. 1, the magnetic flux is concentrated to that portion of each of the air gaps 9a, 9b, 9c which coincides with each of the center axes of the electromagnetic poles 4a, 4b, 4c. The magnetic flux is superimposed one upon the other at that portion of each air gap which is located between the two adjacent electromagnetic poles 4a and 4b on the one hand and between the two adjacent electromagnetic poles 4a and 4c on the other hand. As a result, the magnetic flux is uniformly distributed along the convex surface 6 of the erasing head 1 and hence the erasing head 1 is uniformly magnetized along the convex surface 6 thereof. Thus, the erasing head 1 is substantially uniformly magnetized along the convex surface 6 thereof, thereby making the surface flux density substantially uniform along the convex surface 6 of the erasing head 1.

In addition, the alignment of the center axis 10 of the erasing head 1 with the center axis 11 common to both the opposed electromagnetic poles 4a and 5a is correctly maintained during their assembly with the aid of the jig, so that there is no risk of the direction of the magnetic flux from the erasing head 1 after its magnetization being deviated from the direction of the center axis 10 of the erasing head 1.

Figure 10:
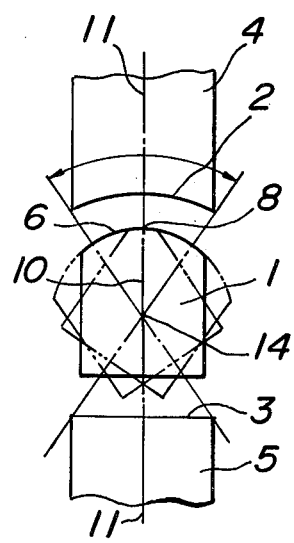
FIG. 10 is a plan view showing schematically a fourth embodiment of the method according to the invention.

In FIG. 10 is shown a fourth embodiment of the method according to the invention. In the present embodiment, the erasing head 1 to be magnetized is disposed in the space between the two opposed electromagnetic poles 4 and 5 shown in FIG. 3, then the center axis 10 of the erasing head 1 is mechanically maintained in alignment with the center axis 11 common to both the two opposed electromagnetic poles 4 and 5 with the aid of the jig shown in FIGS. 6 and 7, subsequently the direct current magnetic field is produced in the space formed between the two opposed electromagnetic poles 4 and 5, and finally the two opposed electromagnetic poles 4 and 5 are made stationary and the erasing head 1 is rotated reciprocally about its center of the radius of curvature 14 as shown by dot and dash lines in FIG. 7.

Such reciprocal rotation of the erasing head 1 about its center of the radius of curvature 13 makes it possible to uniformly distribute the magnetizing flux concentrated at the top 8 of the erasing head 1 along the convex surface 6 thereof. As a result, the surface magnetic flux density along the convex surface 6 of the erasing head 1 becomes uniform.

In addition, the correct alignment of the center axis 10 of the erasing head 1 with the center axis 11 common to both the two opposed electromagnetic poles 4 and 5 maintained mechanically by means of the jig before magnetization of the erasing head 1 is capable of preventing the direction of flux from the erasing head 1 after magnetization from being inclined from the center axis 10 thereof, which has been encountered with the known method described with reference to FIGS. 1, 2a and 2b.

Figure 11:
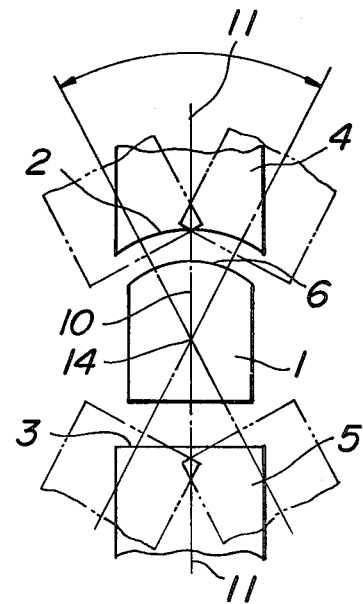
FIG. 11 is a plan view showing schematically a fifth embodiment of the method according to the invention.

In FIG. 11 is shown a fifth embodiment of the method according to the invention. In the present embodiment, the erasing head 1 to be magnetized is disposed in the space formed between the two opposed electromagnetic poles 4 and 5, then the center axis 10 of the erasing head 1 is mechanically maintained in alignment with the center axis 11 common to both the electromagnetic poles 4 and 5 with the aid of the jig and subsequently the direct current magnetic field is produced in the space between the two opposed electromagnetic poles 4 and 5 in the same manner as the embodiment shown in FIG. 10.

In the present invention, however, the erasing head 1 is made stationary and the two opposed electromagnetic poles 4 and 5 are rotated reciprocally about the center of the radius of curvature 14 of the erasing head 1 as shown by dot and dash lines in FIG. 11.

Such reciprocal rotation of the two opposed electromagnetic poles 4 and 5 about the center of radius of curvature 14 of the erasing head 1 is also capable of making the surface magnetic flux density along the convex surface 6 of the erasing head 1 uniform.

What is claimed is:

1. A method of magnetizing with opposed electromagnetic poles an erasing head for small type tape recorders including at least one convex surface which makes contact with a magnetic tape, comprising making that end surface of opposed electromagnetic poles which is opposed to a convex surface of an erasing head concave, said concave surface corresponding to said convex surface of said erasing head, such that a tangential direction of a tape travelling movement is perpendicular to a direction of magnetic flux of said erasing head;

precisely making a thickness of air gap formed between said concave surface of said electromagnetic pole and said convex surface of said erasing head constant with the aid of a jig;

magnetizing said erasing head such that a widthwise direction of said tape is perpendicular to said magnetic flux direction;

testing said erasing head so as to detect a deviation angle of the direction of magnetization from a reference direction with the aid of a tester;

correcting said direction of magnetization so as to make said deviation angle zero with the aid of said jig; and finally magnetizing a lot of erasing magnets with the aid of said jig.

2. The method according to claim 1, wherein said opposed electromagnetic poles are divided into three opposed electromagnetic poles and said erasing head is magnetized such that said tangential direction of said tape travelling movement and said widthwise direction of said tape are perpendicular to said direction of said magnetic flux of said erasing head.

3. The method according to claim 2, wherein said erasing head is rotated about a center of the radius of curvature of said erasing head and magnetized such that said tangential direction of said tape travelling movement and said widthwise direction of said tape are perpendicular to said direction of said magnetic flux of said erasing head.

4. The method according to claim 1, wherein said opposed electromagnetic poles are rotated about a center of the radius of curvature of said erasing head to be magnetized.

* * * * *